(12) United States Patent
Hipp (10) Patent No.: US 11,440,616 B2
(45) Date of Patent: Sep. 13, 2022

(54) DEVICES AND METHODS FOR OVERHEAD CRANKS

(71) Applicant: TH Innovative Products, LLC, Wadsworth, IL (US)

(72) Inventor: Timothy Hipp, Wadsworth, IL (US)

(73) Assignee: TH Innovative Products, LLC, Wadsworth, IL (US)

( * ) Notice: Subject to any disclaimer, the term of this patent is extended or adjusted under 35 U.S.C. 154(b) by 8 days.

(21) Appl. No.: 15/931,859

(22) Filed: May 14, 2020

(65) Prior Publication Data

US 2021/0039742 A1 Feb. 11, 2021

Related U.S. Application Data

(60) Provisional application No. 62/871,159, filed on Aug. 6, 2019.

(51) Int. Cl.
*B62M 3/02* (2006.01)

(52) U.S. Cl.
CPC ..................................... *B62M 3/02* (2013.01)

(58) Field of Classification Search
CPC ............... B62M 3/02; E05Y 2900/512; E05Y 2201/68; E05F 9/00; E05F 11/505; B60J 7/1642; B60J 7/057; B60P 3/36; Y10T 16/4719; Y10T 16/473
See application file for complete search history.

(56) References Cited

U.S. PATENT DOCUMENTS

| 1,592,942 | A | * | 7/1926 | Hanson | F02N 1/02 74/548 |
| 1,643,281 | A | * | 9/1927 | Baumann | E04F 10/0648 160/300 |
| 3,846,938 | A | | 11/1974 | Kelly | |
| 4,068,408 | A | | 1/1978 | Hauber | |
| 4,120,524 | A | | 10/1978 | Buck, Jr. | |
| 4,201,122 | A | | 5/1980 | Maciag | |
| 4,201,123 | A | | 5/1980 | Maciag et al. | |
| 4,307,655 | A | | 12/1981 | Parks et al. | |
| 4,715,089 | A | * | 12/1987 | Schema | B25G 1/04 16/429 |

(Continued)

FOREIGN PATENT DOCUMENTS

| CN | 202140006 U | * | 8/2012 | .............. E06B 9/76 |
| DE | 20316827 U1 | | 12/2003 | |

(Continued)

OTHER PUBLICATIONS

SureReach RV Roof Vent Handle Extension, Gander RV&Outdoors, CWI, Inc. 2021 (Year: 2021).*

(Continued)

*Primary Examiner* — Vinh Luong
(74) *Attorney, Agent, or Firm* — Neal, Gerber & Eisenberg LLP (57) ABSTRACT

A crank extension device for an overhead crank. The device comprises a shell configured to fit over a crank handle, and the shell comprises an aperture for passage of the crank shaft. The device also comprises an extension connected to or integral with the shell, wherein the extension has an extension axis offset from a rotational axis of the crank shaft. Methods of modifying an. overhead crank and for using a crank extension device.

13 Claims, 9 Drawing Sheets

(56) References Cited

U.S. PATENT DOCUMENTS

| | | | |
|---|---|---|---|
| 4,867,047 A | 9/1989 | Citron | |
| 5,054,377 A | 10/1991 | Mochel et al. | |
| 5,374,215 A | 12/1994 | Crider et al. | |
| 5,421,060 A * | 6/1995 | Miller | A01G 3/053 |
| | | | 16/427 |
| 5,823,067 A * | 10/1998 | Clarys | B60J 7/085 |
| | | | 74/546 |
| 6,038,946 A * | 3/2000 | Jackson | B25B 23/0021 |
| | | | 81/177.2 |
| 6,457,208 B1 * | 10/2002 | Keith | E05B 1/0053 |
| | | | 16/422 |
| 6,901,825 B1 * | 6/2005 | Lebron | B25B 13/5091 |
| | | | 81/124.2 |
| 6,902,473 B1 | 6/2005 | Goobeck | |
| 6,959,468 B1 | 11/2005 | Danger | |
| 6,959,914 B1 * | 11/2005 | Corral | E03C 1/021 |
| | | | 251/293 |
| 7,082,644 B2 | 8/2006 | Senner | |
| 7,347,338 B2 | 3/2008 | Korpela | |
| 8,032,999 B2 * | 10/2011 | Herd | G05G 1/503 |
| | | | 29/402.03 |
| 9,416,986 B2 | 8/2016 | Huber | |
| 10,059,164 B1 | 8/2018 | Jerney | |
| 10,093,152 B2 | 10/2018 | Allard et al. | |
| 2004/0025300 A1 * | 2/2004 | Senner | B60P 3/36 |
| | | | 16/427 |
| 2005/0011547 A1 | 1/2005 | Herndon et al. | |
| 2007/0080313 A1 * | 4/2007 | Marcoz | F16K 31/60 |
| | | | 251/293 |
| 2007/0160481 A1 | 7/2007 | Milks | |
| 2007/0257243 A1 * | 11/2007 | Cofer | B66F 3/00 |
| | | | 254/419 |
| 2008/0139101 A1 | 6/2008 | Bickel et al. | |
| 2009/0266203 A1 * | 10/2009 | Orr | B25B 9/00 |
| | | | 81/64 |
| 2010/0043591 A1 * | 2/2010 | Bi | H02B 11/133 |
| | | | 74/545 |
| 2011/0162214 A1 * | 7/2011 | Codeluppi | A01D 34/902 |
| | | | 30/276 |
| 2018/0105020 A1 | 4/2018 | Smith et al. | |
| 2018/0370339 A1 | 12/2018 | Bacon | |

FOREIGN PATENT DOCUMENTS

| | | | |
|---|---|---|---|
| DE | 102017209810 A1 | 12/2018 | |
| EP | 1684150 A1 * | 7/2006 | G05G 1/08 |
| GB | 2542553 A | 3/2017 | |

OTHER PUBLICATIONS

Define nonparallel comparison, Google Search, Jan. 15, 2022 (Year: 2022).*
Define crankshaft, Google Search, Jan. 14, 2022 (Year: 2022).*
Define connect, Google Search, Jan. 14, 2022 (Year: 2022).*
Nonparallel Comparisons, The Mayfield Handbook of Technical & Scientific Wrting, Jan. 14, 2022 (Year: 2022).*
Barker VentStik brochure, Sep. 13, 2007.
Strybuc RV Hardware brochure, Sep. 2011.

* cited by examiner

DEVICES AND METHODS FOR OVERHEAD CRANKS

CROSS REFERENCE TO RELATED APPLICATIONS

This application claims benefit of the filing date and right of priority to U.S. Provisional Application No. 62/871,159, filed on Jul. 7, 2019, which is incorporated by reference herein.

FIELD

The present invention relates to overhead cranks and ways of facilitating the operation of overhead cranks.

BACKGROUND

Overhead cranks can be found in various settings. For instance, recreational vehicles (RV) usually have ceiling vents, hatches or other structures that are operated by an overhead crank. The vents and hatches are usually closed when the RV is in motion, but it is often desirable to open them to allow fresh air into the vehicle. The overhead crank converts rotary motion to linear motion, and by turning the crank, a vent cover or hatch can be moved up or down.

Overhead cranks are usually mounted on or near the ceiling and high from the floor, so that occupants of the RV do not run into it, and so that the crank is close to the structure being operated. As a result, many RV occupants must stand on a step ladder, chair or box to reach the overhead crank. Due to the limited space in an RV, it is undesirable to store a step ladder, and standing on a chair or box creates a risk of fall and injury.

Senner U.S. Pat. No. 7,082,644 discusses a handle extension for rotating a crank handle which includes an elongate shaft having a first end and a second end. A member with a receptacle for engaging the crank handle is mounted at the first end of the shaft. When the second end of the shaft is grasped and a rotational force imparted to the shaft, the crank handle is caused to rotate. This handle extension is said to be useful with crank handle-operated ceiling-mounted ventilation openings commonly found in recreational vehicles.

Jerney U.S. Pat. No. 10,059,164 discusses a method of operating at least one of a fan and a vent in a ceiling of a recreational vehicle using an extension arm. The extension arm includes an extension with an operable end and the method comprises grabbing the extension arm with one's hand; engaging one of a turn switch, a turn crank, and a knob of one of the fan and vent in the ceiling of the recreational vehicle with the operable end; and rotating one of the turn switch, the turn crank, and the knob with the operable end by rotating the extension arm with one's hand.

However overhead cranks can be difficult to rotate, especially after they age and experience corrosion or other deterioration. Extension arms may not engage a crank tightly and/or may not apply sufficient force to rotate a rusted crank. Extension arms may be difficult to properly engage with an overhead crank, as a user has to precisely fit the extension arm's end with the crank, and has to do so while raising the extension arm above his head. Extension arms may also take up too much space, as RV owners may not wish to store a long pole in the limited space of an RV. Accordingly, better devices and methods for operating an overhead crank are desirable.

SUMMARY

As one aspect of the present invention, a crank extension device is provided for an overhead crank that has a crank shaft having a rotational axis for operating the crank, and a crank arm extending from the crank shaft. The crank extension device comprises a shell configured to fit over and apply force to a crank arm, which generally results in the shell being positioned between a crank arm and a cranked object. The shell has an aperture for a crank shaft to pass through. The crank extension device also comprises an extension connected to or integral with the shell. The extension has an extension axis offset from the rotational axis of the crank shaft.

In some embodiments of the present device, the shell and the extension are configured to cover a crank handle that protrudes at a downward angle from the crank arm and is offset from the rotational axis of the crank shaft. In some embodiments, the crank extension also comprises a removable shaft lengthener configured to connect with the extension. For example, the extension can have one or more pins, and the removable shaft lengthener can have one or more holes, slots, or hooks configured (e.g., positioned and sized) to securely engage the pins.

As another aspect of the present invention, a method of modifying an overhead crank is provided. The overhead crank can be modified by installing one of the crank extension devices described herein. The method comprises passing a crank shaft through the aperture; placing the shell over a crank handle; and attaching the crank shaft to a cranked object, wherein the shell is fixed in position between the crank handle and the cranked object. The method may also include detaching the crank arm and/or crank handle from the cranked object so that the shell can be placed over the crank arm and/or crank handle. In some embodiments, the method includes obtaining a set of shells having shell cavities of different geometries (such as different sizes or shapes), and selecting one of the shells from the set that fits a crank handle.

As yet another aspect of the present invention, a method is provided for operating an overhead crank which is fitted with a crank extension device comprising a shell and an extension. The method comprises moving the extension in a circular motion, wherein the circular motion has substantially the same axis as the rotational axis of the crank shaft and a larger diameter than the crank shaft. The overhead crank can be operated by pulling or pushing the extension in a circular motion without twisting the extension. The present crank extension devices differ from conventional extension arms in that twisting the present extension does not rotate the crank shaft and/or pulling the extension downward does not separate the shell from the crank. In some embodiments, the present method include connecting a removable shaft lengthener to a lower end of the extension. The method can also include disconnecting the removable shaft lengthener without removing the shell from the crank. The removable shaft lengthener is easy and convenient to store, even in the limited space of a recreational vehicle.

The present teachings are best understood from the following detailed description when read with the accompanying drawing figures. The features are not necessarily drawn to scale.

DETAILED DESCRIPTION

The present invention relates to crank extension devices and methods for operating overhead cranks. The present devices and methods have several advantages over existing approaches, such as reducing inconvenience and risk of injury. With the present devices, persons of medium or short stature are better able to engage and rotate the overhead crank, without standing on a chair or box and risking injury. The present devices and methods avoid difficulties in positioning an extension arm so that it properly engages a crank handle while reaching up from floor level.

In some embodiments, the present invention is an extension for a camper ceiling vent handle, allowing or assisting a shorter person to open or close the roof vent in a RV or trailer. In some embodiments, the shell (body shape) of the crank extension device follows the same contours as the original crank handle for a sleek aesthetic and has a shelled design for more forgiving and easy fit to the crank handle. In some embodiments, more than half of the extension opening is enclosed, resisting snapping of lower extension. The rounded edge helps passively guide the handle into place. 7/16" height crank shaft port (attachment port) defines and surrounds an aperture; the height is limited to allow the original handle to extend beyond design and not disturb normal attachment to vent. No additional hardware required for use, just the original, removable handle and its respective fastening method.

The present devices comprise a shell that covers a crank arm and optionally a crank handle, and an extension that extends downward from the shell. The shell is configured to apply force to a crank arm. The shell wall can extend beyond an inserted handle to account for lateral shifting when used for a more secure hold. The extension can be moved in a circular motion without twisting it, but rather so that it moves in a circle around the rotational axis of the crank shaft. The present devices allow force to be transmitted to the overhead crank by pushing or pulling a shaft in a circular motion, rather than by twisting the shaft in order to rotate it. Another advantage of the present device is that it can be pulled down in order to apply force to a top portion of an overhead crank arm, in contrast to conventional extension arms, where pulling downward would separate the extension arm from the crank.

Figure 1:
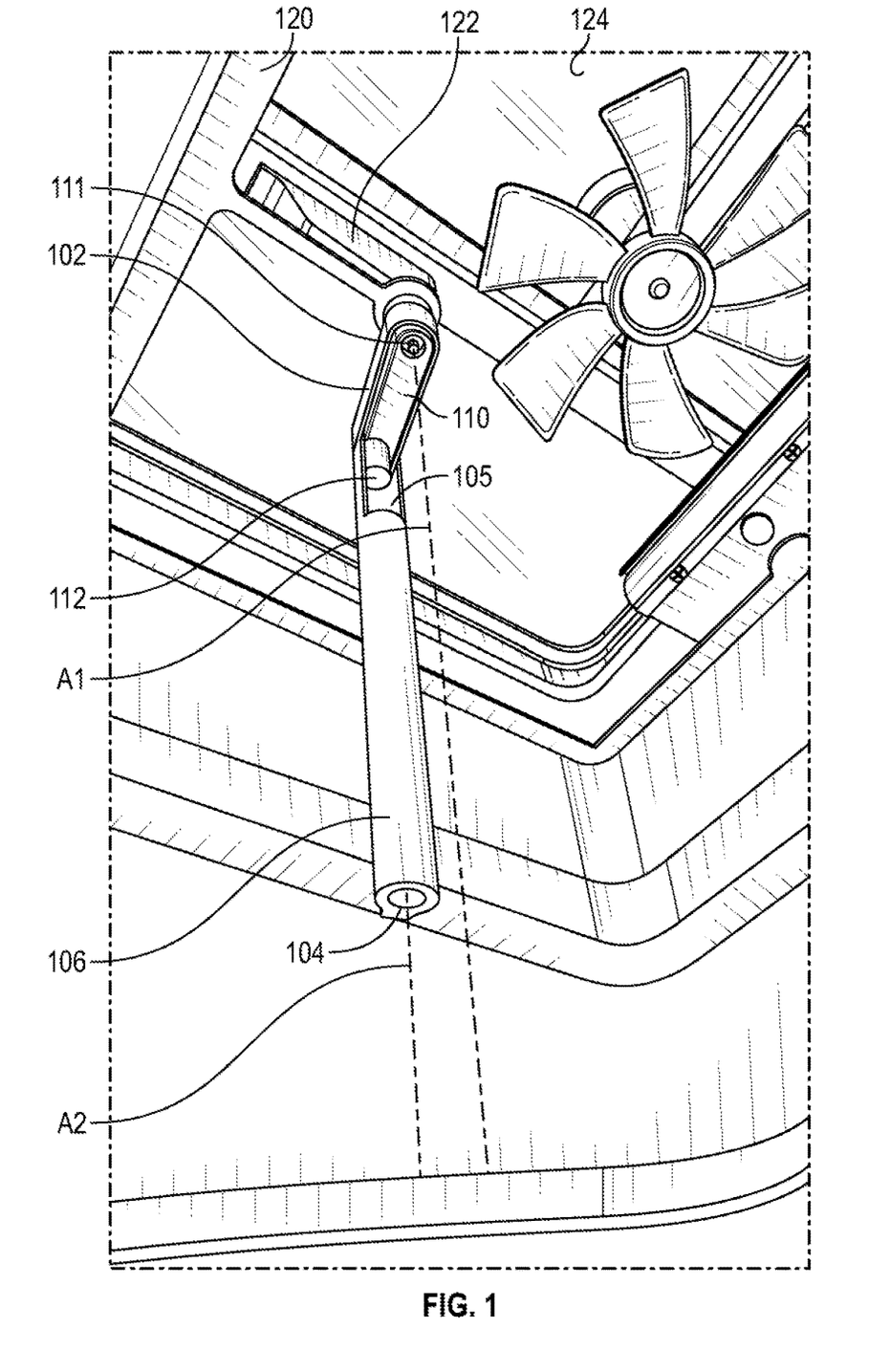
FIG. 1 shows an embodiment of the present device installed on an overhead crank in a recreational vehicle.

FIG. 1 shows an embodiment of the present crank extension device installed on an overhead crank 122 in a recreational vehicle 120. The overhead crank 122 comprises a circular crank arm extending from a crank shaft 111 having a rotational axis A1 for operating the crank, a crank arm 110 extending at an angle (e.g., substantially perpendicular) from the crank shaft, and a crank handle 112. The crank arm 110 separates the crank shaft 111 from the crank handle 112, and is axially offset from the rotational axis of the crank shaft 111. The crank extension device comprises a shell 102 adapted to fit over the crank handle 112, or between the crank handle 110 and the ceiling, and the shell 102 comprises an aperture for passage of the crank shaft 111.

In some embodiments, a shell comprises a shell roof, a shell wall extending from the shell roof, and the shell has an open bottom. The shell wall can be one circular shell wall, or it can comprises multiple shell sides connected by shell corners. The shell wall can have a height at least 1 cm, or at least 2 cm, or at least 3 cm, and/or at most 12 cm, or at most 10 cm, or at most 6 cm. In some embodiments, the shell wall extends beyond a crank arm inserted in the shell. The shell roof has a top surface and a bottom surface. In some embodiments, a shell port projects from the top surface and the shell wall projects from the bottom surface, wherein the shell port defines the aperture for a crank shaft to pass through. In some embodiments, the shell port has a height no more than 7/16". The height can be limited to allow the original crank handle to extend beyond design and not disturb normal attachment to vent.

The crank extension device of FIG. 1 also comprises an extension 104 attached to or integral with the shell 102, wherein the extension 104 has an extension axis A2 offset from the rotational axis A1 of the crank shaft 111. As can be seen, the extension axis A2 is not coaxial with the rotational axis A1 of the crank shaft, but rather is separated by the distance of the crank arm 110. By moving the extension 104 around the rotational axis A1 of the crank shaft, the crank handle 112 is rotated, and the vent 124 is opened or closed (based on the direction of rotating the crank). The shell 102 can be at an angle to the extension 104, such as between 80° and 130°, or between 90° and 120°, or approximately 105°. In some embodiments, extension axis A2 is substantially parallel to rotational axis A1. The extension can be partially or fully enclosed and solid and/or hollow.

Figure 2A:
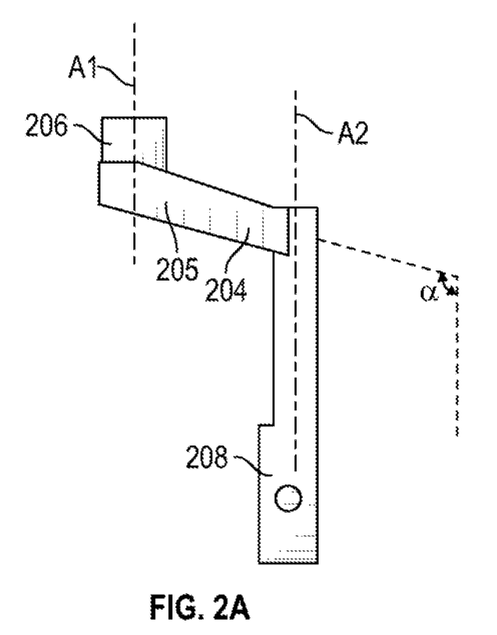
FIGS. 2A to 2C illustrate an embodiment of the present crank extension device.
Figure 2B:
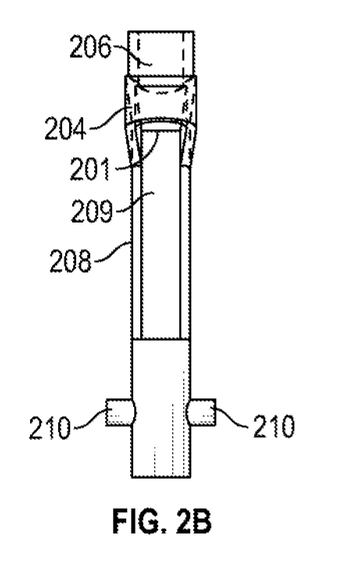
Figure 2C:
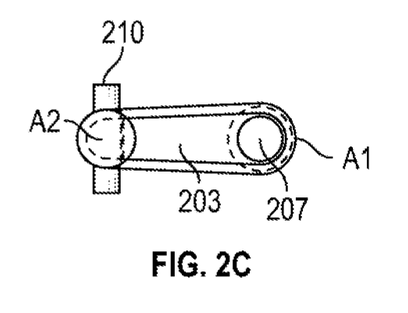
Figure 3A:
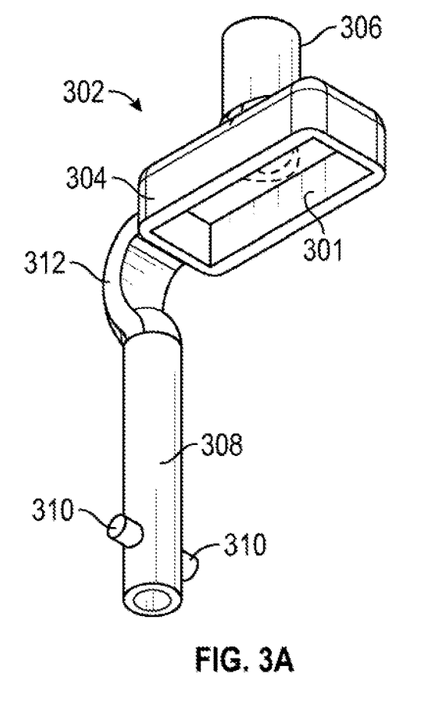
FIGS. 3A to 3D illustrate another embodiment of the present crank extension device.
Figure 3B:
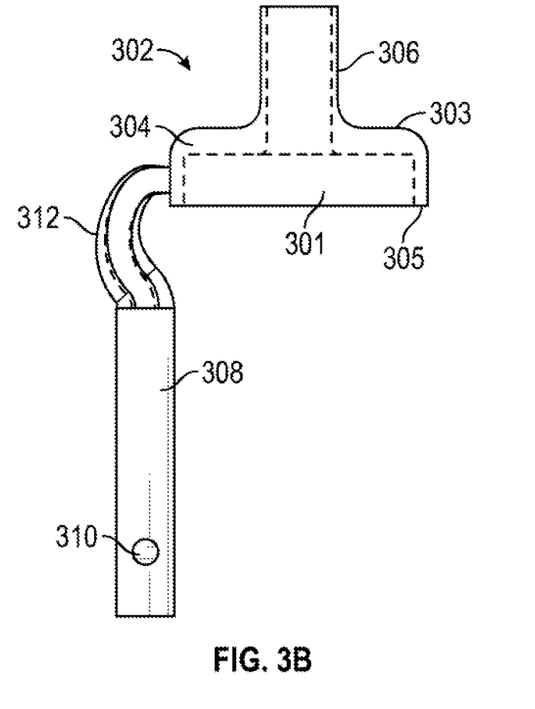
Figure 3C:
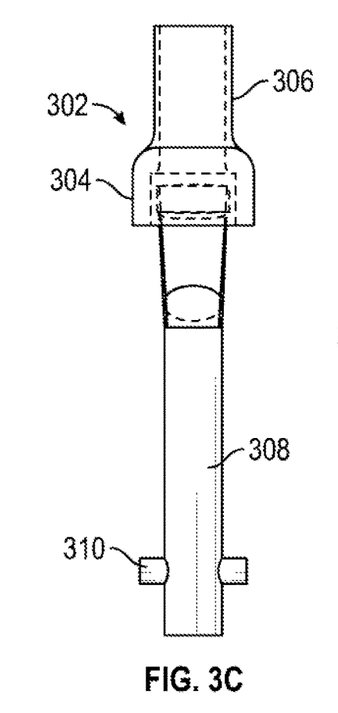
Figure 3D:
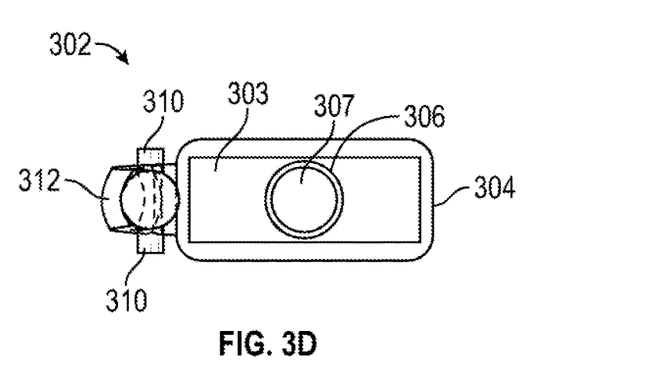
Figure 4A:
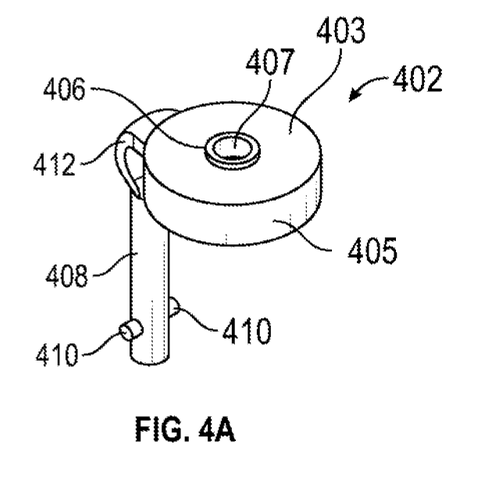
FIGS. 4A to 4D illustrate yet another embodiment of the present crank extension device.
Figure 4B:
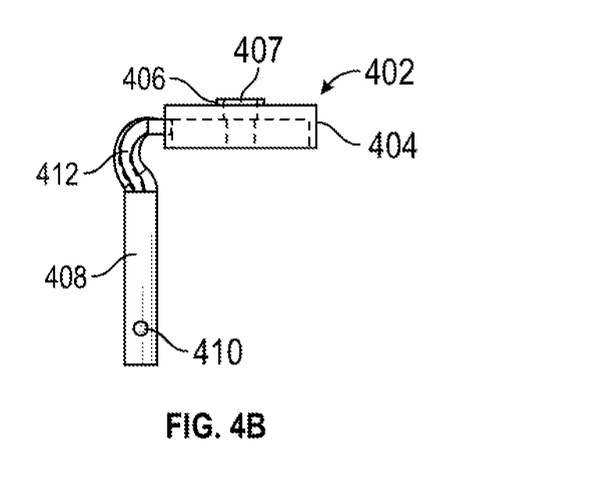
Figure 4C:
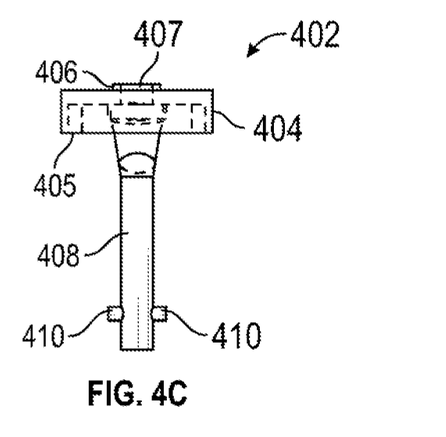
Figure 4D:
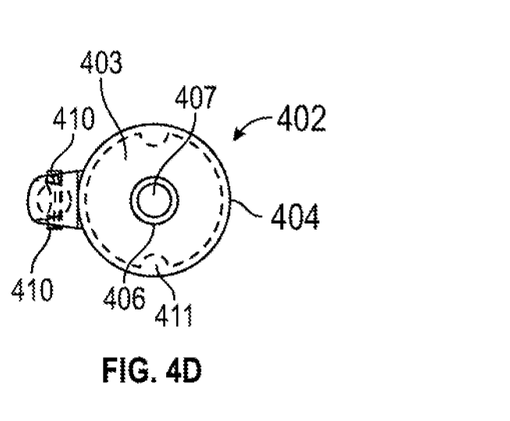
Figure 5A:
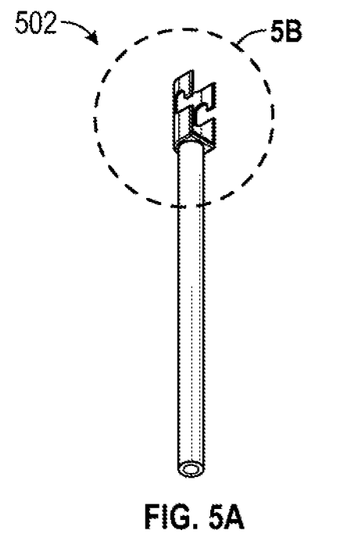
FIG. 5A to 5D show an embodiment of a removable shaft lengthener.
Figure 5B:
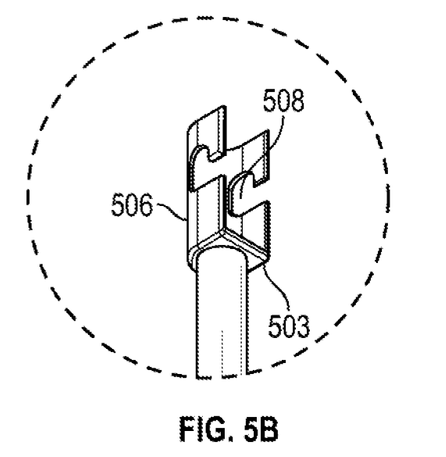
Figure 5C:
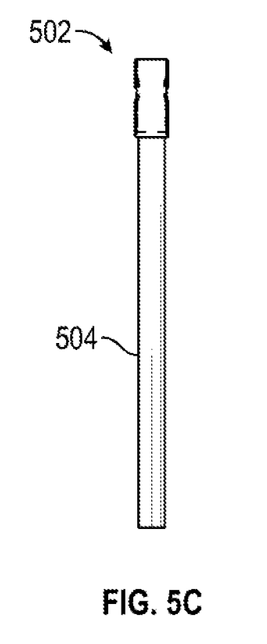
Figure 5D:
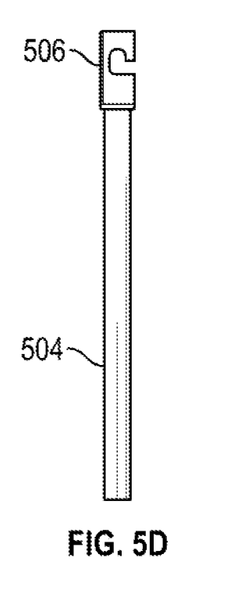

FIGS. 2A to 2C illustrate an embodiment of the present crank extension device. FIG. 2A shows a side view of the crank extension device 202 which comprises a crank arm shell 204 configured to fit over a crank arm. Crank arm shell 204 comprises a shell roof 203 and shell walls 205, and it has an open bottom, so that a shell cavity is formed by the shell roof 203 and shell walls 205. Shell cavity fits over a crank arm. Crank extension device 202 also comprises a crank shaft port 206 which extends upward from crank arm shell 204. A shell port 206 surrounds an aperture through which a crank shaft can extend. Extension 208 is integral with shell 202, and it can enclose a crank handle if one is present. Extension 208 can be solid or hollow, and may comprise an extension wall that is closed or partially open. In some embodiments, the extension 208 is hollow and has a wall thickness of at least 3/32", so that the entire handle for solid construction. It has a 1/16" oversized internal cavity for easy insertion and compensation for temperature and humidity changes.

Extension 208 can have one or more pins 210 for connecting it to a removable shaft. Shell 202 can be at an angle α to extension 208, such as an angle between 90° and 120°. FIG. 2B shows a front view of shell 202 and extension 208. FIG. 2B more clearly shows a partially open wall 209 of the extension 208 extending down from shell chamber 201. FIG. 2C shows a top view of shell 202 and more clearly shows aperture 207 for a crank shaft.

FIGS. 3A to 3D illustrates another embodiment of a crank extension device 302, which is configured to engage a crank having a different structure. Device 302 comprises a crank arm shell 304 which defines a shell cavity 301 for a crank arm. More particularly, shell cavity 303 is configured to cover the handle of a crank whose crank shaft is connected to the middle of its crank arm. As can be seen, shell cavity 303 is rectangular in shape. Shell 304 comprises a shell roof 303 shall walls 305. Device 302 also includes a shell port 306, and it is connected to an extension 308 by an elbow 312. Pins 310 are located at a lower area of the extension 308 for connecting to a removable shaft lengthener.

FIGS. 4A to 4D illustrate another embodiment of a crank extension device 402, which is configured to engage a crank having a different structure. Device 402 comprises a crank handle shell 404 which defines a shell cavity for a crank handle. More particularly, shell cavity is circular and configured to cover a circular crank arm of a crank shell 404 comprises a shell roof 403 and a shell wall 405. Device 402 also includes a shell port 406 and a shell aperture 407. Shell 404 is connected to an extension 408 by an elbow 412. Pins 410 are located at a lower area of the extension 408 for connecting to a removable shaft lengthener. The shell cavity can include one or more protrusions 411 to engage a crank arm.

Other aspects of the present invention are the ornamental designs of the crank extension devices shown in FIGS. 2A to 2C, 3A to 3D, and 4A to 4D. The ornamental designs consist of the features of shape, ornamentation, and configuration of the devices shown in the drawings.

The present devices can also include a removable shaft lengthener adapted to connect with the extension, so that together they form an operable crank comprising a handle of greater length. The removable shaft lengthener can be desirable to avoid an extension that takes up an excessive amount of the limited space in a recreational vehicle. A removable shaft lengthener that can be easily disconnected for storage is advantageous, as is a shaft lengthener that is easily and quickly connected to form a rigid, strong device. The present devices can achieve such advantages through a variety of connection mechanisms between the extension and the removable shaft lengthener. The connection mechanism should be sufficiently strong to allow rotation and transmission of force needed to rotate the overhead crank. A wide variety of connection mechanisms can be included in the present devices and employed in the present methods, such as pins, latches, and others.

For instance, in some embodiments, the extension comprises one or more pins, and the removable shaft lengthener comprises one or more holes, slots or other features for receiving the one or more pins. In some embodiments, the extension comprises one or more fixed pins, and the removable shaft lengthener comprises a corresponding pair of notches. Alternatively, the extension can comprise retractable pins, and the removable shaft lengthener can comprise holes for receiving the spring-loaded pins. As another alternative, the extension and the removable shaft lengthener can comprise through-holes, and a retaining pin, a nut and bolt, or other fastener(s) can be inserted through the holes. Retaining pins typically have a locking feature, such as a hole for a cotter pin. Alternatively, the extension and the removable shaft lengthener can contain reciprocal threads so that they can be screwed together. As an example, a 7/16" diameter, 14 UNC threaded hole can be provided at a lower end of the extension to allow for additional sections to be screwed on if more reach is desired. In some embodiments, the extension comprises one or more telescoping shafts. In some embodiments, the removable shaft lengthener can comprise one, two, three, four or more lengthener portions that can be attached by connection mechanisms, including but not limited to those described herein.

FIGS. 5A through 5D show an embodiment of a removable shaft lengthener 502, which comprises a connecting end 503 and a user end 504. Connecting end 503 includes or is attached to a connecting mechanism, which will usually be reciprocal to or adapted for a connecting mechanism of an extension. In FIGS. 5A to 5D, the connecting mechanism is a bracket 506 with slots 508 adapted to engage the pins of an extension (such as pins 210, 310, or 410).

Figure 6:
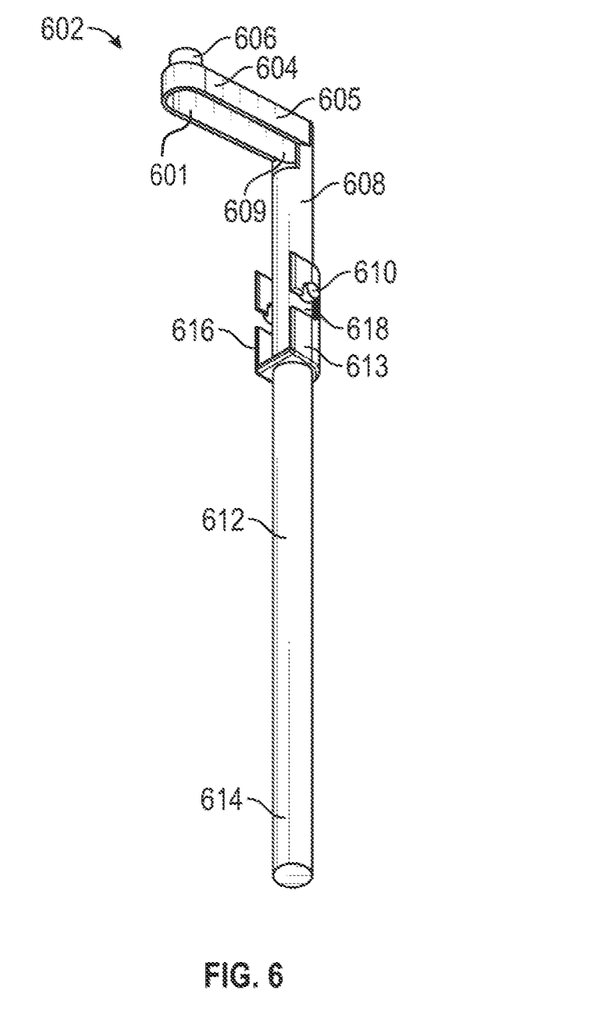
FIG. 6 shows an embodiment of a crank extension device that also comprises a removable shaft lengthener.

FIG. 6 shows an embodiment of a crank extension device that also comprises a removable shaft lengthener. Device 602 comprises a crank arm shell 604 configured to fit over a crank arm. Crank arm shell 604 comprises a shell roof and shell walls 605, and it defines a shell cavity 601. Device 602 also comprises a shell part 606 which surrounds an aperture through which a crank shaft can extend. Extender 608 is integral with shell 604, and it has an open portion 609 which can enclose a crank handle if one is present. Device 602 also comprises a removable shaft lengthener 612, which comprises a connecting end 613 and a user end 614. Connecting end 613 has a bracket 616 with slots 618 to engage pins 610 of extension 608.

The removable shaft lengthener can be any suitable size or shape. In some embodiments, the removable shaft lengthener is about 9/16" in diameter, thereby allowing a user to have a solid grip when cranking. In some embodiments, the removable shaft lengthener is about 8" long. It can have an opening of appropriate size, including a diameter than narrows along its length (e.g., 21/32") to allow easy insertion of the extension, and a shorter extension (less material) where not needed.

The present devices can be made from any materials having desirable properties, especially lightweight, rigid materials. In some embodiments, the shell comprises a lightweight plastic material and further comprises an internal grid structure to provide additional strength. Suitable materials include various types of hard plastics, such as polyethylene (PE), ultra-high-molecular-weight polyethylene (UHMWPE), polypropylene (PP)(which may be referred to as polyprotein, polipropene 25, propene polymers, propylene polymers, or 1-propene), including propylene homopolymer and polypropylene copolymers, polyethylene, including polyethylene homopolymer and polyethylene copolymers, thermoplastic polyesters, thermoplastic polymers, ABS acrylic polymer, nylon, polylactic acid (PLA), polycarbonate, polystyrene, polyvinyl chloride (PVC), acrylate, melamine, hard rubbers, fiberglass, carbon fiber, metals and metal alloys such as aluminum alloys, wood, glass, or any other material that has suitable rigidity and strength, including combinations of materials.

In some embodiments, a lower end of the extension and/or a lower end of a removable shaft lengthener comprises one or more features to facilitate operation by and/or comfort for the user. The lower end of the extension and/or lower end of a removable shaft lengthener can be made from or comprise any of the materials set forth above as having suitable rigidity and strength, and can include additional materials to accommodate or facilitate use by the user. For example, the lower end can be wrapped with padding or other material to facilitate gripping. Suitable materials include rubber, polyurethane foam, or other conformable materials.

The present devices can be formed by any suitable method or technique. For instance, the devices can be formed by 3D printing or additive manufacturing, CNC machining, polymer casting, rotational molding, vacuum forming, injection molding, extrusion, blow molding, and combinations thereof.

Figure 7A:
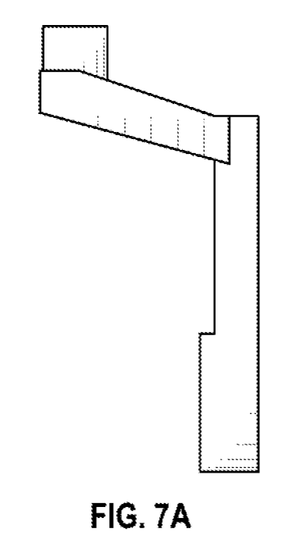
FIGS. 7A to 7C illustrate an ornamental design of the present crank extension device.
Figure 7B:
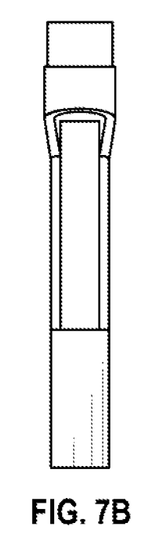
Figure 7C:
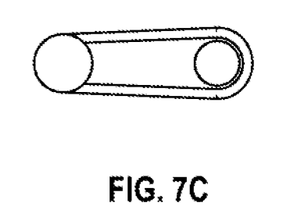
Figure 8A:
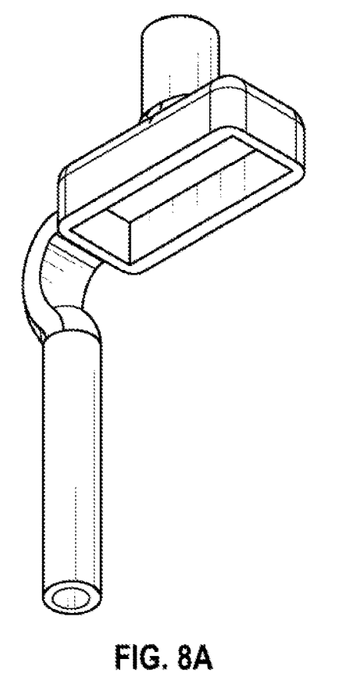
FIGS. 8A to 8D illustrate another ornamental design of the present crank extension device.
Figure 8B:
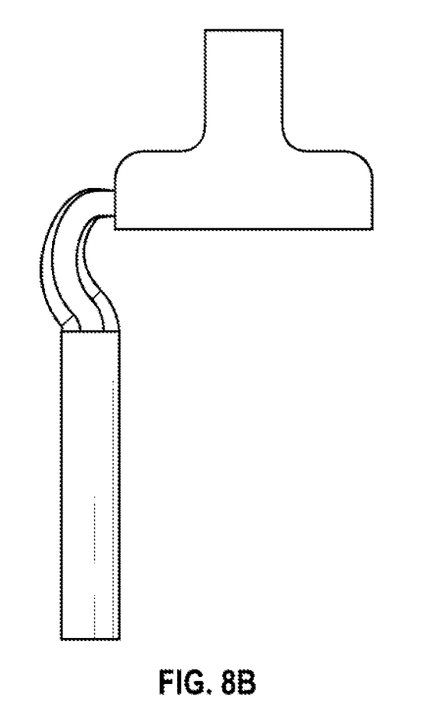
Figure 8C:
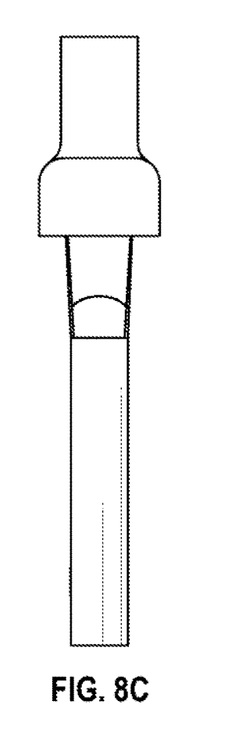
Figure 8D:
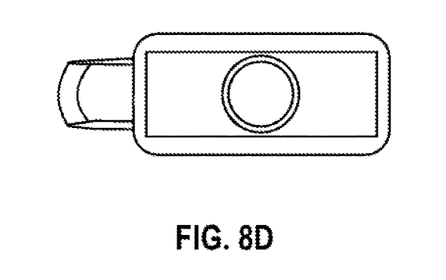
Figure 9A:
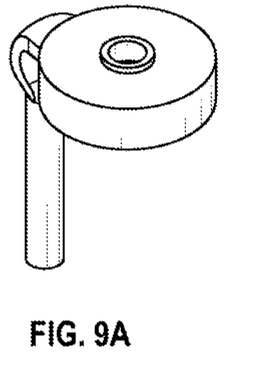
FIGS. 9A to 9D illustrate yet another ornamental design of the present crank extension device.
Figure 9B:
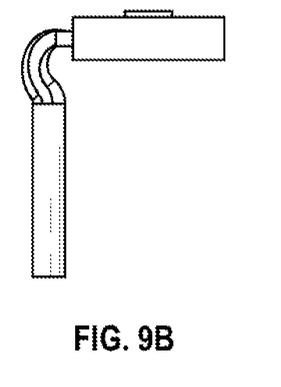
Figure 9C:
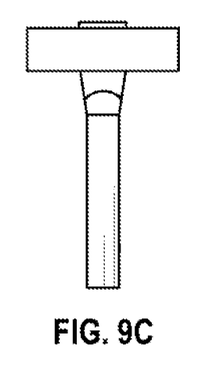
Figure 9D:
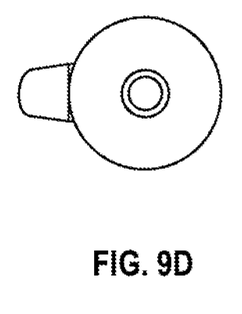

FIGS. 7A to 9D illustrate various ornamental designs for a crank extension device. FIGS. 7A to 7C illustrate an ornamental design of a crank extension device that includes a substantially rectangular shell. FIGS. 8A to 8D illustrate another ornamental design of the present crank extension device. FIGS. 9A to 9D illustrate yet another ornamental design of the present crank extension device. In figures intended to illustrate an ornamental design, the purpose of any broken lines is to show environmental structure or boundaries that form no part of the design to be patented.

Defined Terminology

The term "crank" refers to any device or mechanism that converts rotary motion to linear motion or vice versa, typically by rotating a crank shaft. A crank generally comprises a shaft configured for rotation, and a portion that moves linearly or in a wider circle than the shaft. The term "overhead crank" generally refers to any crank positioned such that a person has to reach up to operate the crank, such as a crank at or near a ceiling of a room or vehicle. For example, many simple cranks are operable by hand and include a crank shaft having an axis of rotation, and a crank arm extending at an angle (e.g., substantially perpendicular) from the crank shaft. By moving the crank arm in a circle around the rotational axis of the crank shaft, the crank shaft turns and the crank is operated. A crank can also include a crank handle extending from the crank arm to facilitate operation of the crank. For example, the crank handle can be offset from but substantially parallel to the rotational axis of the crank shaft, and substantially perpendicular to the crank arm. A user can grasp the crank handle and move it in a circular motion to operate the crank. A crank can also include one or more mechanisms that connect the crank shaft to an object that moved by operation of the crank. The term "cranked object" refers to the object that is moved by operation of the crank, such as a vent, hatch, or other structure that opens or closes by operation of a crank in an RV.

The terms "a," "an," and "the" include both singular and plural referents, unless the context clearly dictates otherwise. Thus, for example, "a crank" includes one crank and plural cranks. Unless otherwise indicated, the terms "first", "second", "third", and other ordinal numbers are used herein to distinguish different elements of the present devices and methods, and are not intended to supply a numerical limit. Reference to first and second components should not be interpreted to mean that the device only has two components. For example, a device having first and second shell portions can also include a third, a fourth, a fifth, and so on, unless otherwise indicated.

The terms "substantial" or "substantially" mean to within acceptable limits or degree. For example, "substantially parallel" means that one skilled in the art would consider any deviation from parallel to be undetectable or negligible. The term "approximately" means to within an acceptable limit or amount to one having ordinary skill in the art. For example, "approximately the same" means that one of ordinary skill in the art would consider the items being compared to be the same.

Relative terms, such as "above," "below," "top," "bottom," "upper" and "lower" may be used to describe the various elements' relationships to one another, as illustrated in the accompanying drawings. These relative terms are intended to encompass different orientations of the device and/or elements in addition to the orientation depicted in the drawings. For example, if the device were inverted with respect to the view in the drawings, an element described as "above" another element, for example, would now be "below" that element.

The disclosures of all patents, publications and literature identified herein are specifically incorporated herein by reference.

I claim:

1. A crank extension device for an overhead crank, wherein the overhead crank comprises a crank shaft having a rotational axis for operating the crank, and a crank arm extending from the crank shaft, the crank extension device comprising:
   a shell configured to fit over and apply force to the crank arm and comprising an aperture for the crank shaft to pass through, wherein the shell comprises a shell roof, a shell wall extending from the shell roof, and the shell has an open bottom; and
   an extension connected to or integral with the shell, wherein the extension has an extension axis offset from the rotational axis of the crank shaft.

2. The crank extension device of claim 1, wherein the shell and the extension are configured to cover a crank handle that protrudes at a downward angle from the crank arm and is offset from to the rotational axis of the crank shaft.

3. The crank extension device of claim 2, wherein the shell comprises a rounded edge configured to passively guide the crank arm or the crank handle into place.

4. The crank extension device of claim 1, wherein the shell roof has a top surface and a bottom surface, and a shell port projects from the top surface and the shell wall projects from the bottom surface, wherein the shell port defines the aperture for the crank shaft to pass through.

5. The crank extension device of claim 4, wherein the shell port has a height no more than 7/16".

6. The crank extension device of claim 4, wherein the shell wall extends beyond the crank arm inserted in the shell.

7. The crank extension device of claim 1, wherein more than half of the extension is enclosed.

8. The crank extension device of claim 1, wherein the shell is at an angle to the extension between 80° and 130°.

9. The crank extension device of claim 1, further comprising a removable shaft lengthener configured to connect with the extension.

10. The crank extension device of claim 9, wherein the extension has one or more pins, and the removable shaft lengthener has one or more holes, slots, or hooks configured to securely engage the pins.

11. A method of modifying an overhead crank with thea crank extension device wherein the overhead crank comprises a crank shaft having a rotational axis for operating the crank, a crank arm extending from the crank shaft, and a crank handle that protrudes at a downward angle from the crank arm, and the crank extension device comprises:
   a shell configured to fit over and apply force to the crank arm and comprising an aperture for the crank shaft to pass through, wherein the shell comprises a shell roof, a shell wall extending from the shell roof, and the shell has an open bottom; and
   an extension connected to or integral with the shell, wherein the extension has an extension axis offset from the rotational axis of the crank shaft, the method comprising:
  passing the crank shaft through the aperture;
  placing the shell over the crank handle; and
  attaching the crank shaft to a cranked object, wherein the shell is fixed in position between the crank handle and the cranked object.

12. The method of claim 11, further comprising detaching the crank handle from the cranked object so that the shell can be placed over the crank handle.

13. The method of claim 11, further comprising obtaining a set of shells having shell cavities of different geometries;
  selecting one of the shells from the set that fits the crank handle.

* * * * *